(12) United States Patent
Inagaki

(10) Patent No.: US 11,787,213 B2
(45) Date of Patent: Oct. 17, 2023

(54) DETERMINATION DEVICE, CONTROL METHOD FOR DETERMINATION DEVICE, DETERMINATION SYSTEM, CONTROL METHOD FOR DETERMINATION SYSTEM, AND PROGRAM

(71) Applicant: DAI NIPPON PRINTING CO., LTD., Tokyo-to (JP)

(72) Inventor: Kouji Inagaki, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 315 days.

(21) Appl. No.: 17/284,304

(22) PCT Filed: Jun. 16, 2020

(86) PCT No.: PCT/JP2020/023613
§ 371 (c)(1),
(2) Date: Apr. 9, 2021

(87) PCT Pub. No.: WO2020/255967
PCT Pub. Date: Dec. 24, 2020

(65) Prior Publication Data
US 2022/0001684 A1    Jan. 6, 2022

(30) Foreign Application Priority Data

Jun. 17, 2019   (JP) ................................. 2019-112239

(51) Int. Cl.
*G06T 7/90* (2017.01)
*B41M 3/14* (2006.01)
(Continued)

(52) U.S. Cl.
CPC ............... *B41M 3/14* (2013.01); *G06F 18/22* (2023.01); *G06T 7/0004* (2013.01); *G06T 7/70* (2017.01);
(Continued)

(58) Field of Classification Search
CPC ........ B41M 3/14; G06F 18/22; G06T 7/0004; G06T 7/70; G06T 7/90;
(Continued)

(56) References Cited

U.S. PATENT DOCUMENTS 6,852,397 B2 * 2/2005 Toshine ................ G09F 3/0292
428/323
2003/0179910 A1 * 9/2003 Wong ................. G06V 40/1347
382/115

(Continued)

FOREIGN PATENT DOCUMENTS

| CN | 107527422 A | 12/2017 |
| JP | 2017-215739 A | 12/2017 |
| WO | 2014/118763 A1 | 8/2014 |

OTHER PUBLICATIONS

May 19, 2022 Extended Search Report issued in European Patent Application No. 20827418.3.

*Primary Examiner* — Ali Bayat
(74) *Attorney, Agent, or Firm* — Oliff PLC

(57) ABSTRACT

A determination system includes an imaging data acquisition device that captures an image of a printed surface of a printed product to acquire imaging data of the captured image, and a determination device that determines, based on the imaging data, a printing method used to produce the printed surface of the printed product for which the image is captured by the imaging data acquisition device. The determination device selects a plurality of determination areas included in the captured image, acquires determination data based on a line-segment image included in each of the determination areas, compares the acquired determination data between two determination areas, and acquires, based on a result of the comparison, a determination value for determining a printing method used to produce the printed surface of the printed product, and determines, based on the (Continued)

determination value, a printing method used to produce the printed surface of the printed product.

28 Claims, 10 Drawing Sheets

(51) Int. Cl.
*G06T 7/70* (2017.01)
*G07D 7/202* (2016.01)
*G06V 30/40* (2022.01)
*G06V 10/22* (2022.01)
*G06T 7/00* (2017.01)
*G07D 7/20* (2016.01)
*G06F 18/22* (2023.01)

(52) U.S. Cl.
CPC ............... *G06T 7/90* (2017.01); *G06V 10/22* (2022.01); *G06V 30/40* (2022.01); *G07D 7/202* (2017.05); *G07D 7/2016* (2013.01); *G06T 2207/10024* (2013.01); *G06T 2207/30144* (2013.01); *G06T 2207/30176* (2013.01); *G07D 2207/00* (2013.01)

(58) Field of Classification Search
CPC . G06T 2207/10024; G06T 2207/30144; G06T 2207/30176; G06T 7/11; G06V 10/22; G06V 30/40; G07D 7/2016; G07D 7/202; G07D 2207/00; G07D 7/2008; G07D 7/20; G07D 7/12; H04N 1/40062; H04N 1/00846; H04N 1/00848
USPC ........................................................ 382/112
See application file for complete search history.

(56) References Cited

U.S. PATENT DOCUMENTS

| | | | |
|---|---|---|---|
| 2010/0253791 A1* | 10/2010 | Silverbrook | B41J 2/17503 348/207.2 |
| 2010/0315516 A1* | 12/2010 | Silverbrook | B41J 2/1648 348/207.2 |
| 2011/0294543 A1* | 12/2011 | Lapstun | H04N 1/00129 455/556.1 |
| 2014/0369569 A1 | 12/2014 | Wicker et al. | |
| 2018/0314904 A1 | 11/2018 | Miao et al. | |

* cited by examiner

PRINTING WITH PLATE

PRINTING WITH PRINTER

EXCLUSION OF AREA WITH BREAK OF OBLIQUE LINE OR THE LIKE

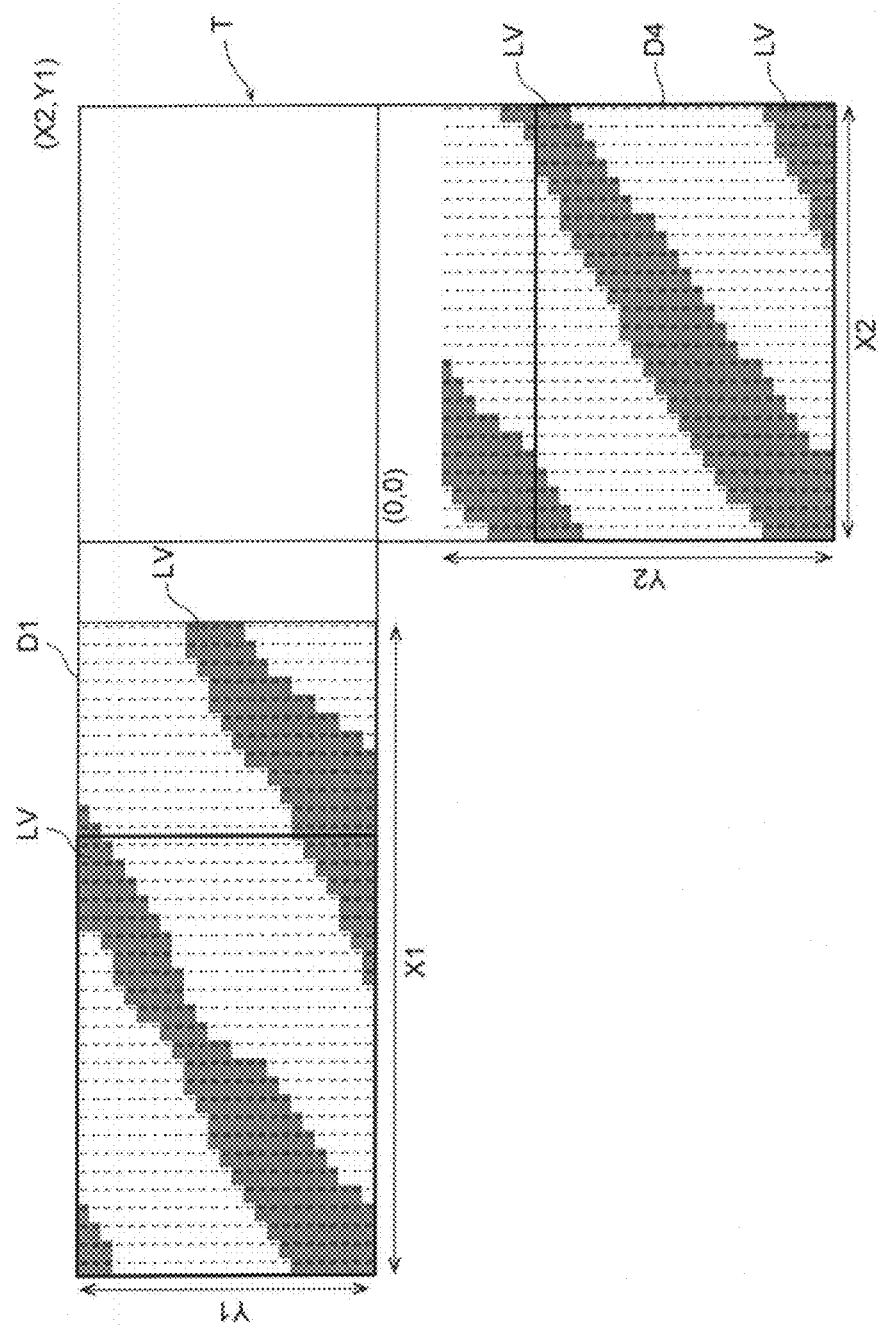

DETERMINATION DEVICE, CONTROL METHOD FOR DETERMINATION DEVICE, DETERMINATION SYSTEM, CONTROL METHOD FOR DETERMINATION SYSTEM, AND PROGRAM

TECHNICAL FIELD

Embodiments of the present disclosure relate to a determination device that determines a printing method used to produce a printed product. Embodiments of the present disclosure also relate to a control method for the determination device, a determination system, a control method for the determination system, and a program.

BACKGROUND ART

Hitherto, it has been necessary to accurately determine the authenticity of a printed product, namely, a voucher such as a bill or a gift certificate, or an identification card such as a driver's license, a basic resident registration card, a residence card, a special permanent resident certificate, or a passport.

For example, PTL 1 discloses a related-art technique for detecting a difference in the color flatness of a scanned image of an object that is printed with a printer based on an area coverage modulation method such as inkjet printing and determining whether the printed product is one printed using the area coverage modulation method.

However, this related-art technique provides determination of only whether a counterfeit printer is a printer based on an area coverage modulation method such as inkjet printing, and does not provide determination of whether a printed product is a printed product printed by a printing method using a plate such as offset printing or a printed product printed by a printing method using a printer that performs printing through scanning using a driving system.

CITATION LIST

Patent Literature

PTL 1: Japanese Unexamined Patent Application Publication No. 2017-215739

DISCLOSE OF INVENTION

It is an object of embodiments of the present disclosure to provide a determination device, a control method for the determination device, a determination system, a control method for the determination system, and a program, which can effectively address the aforementioned problems.

An embodiment of the present disclosure provides a determination system including an imaging data acquisition device that captures an image of a printed surface of a printed product to acquire imaging data of the captured image, and a determination device that determines, based on the imaging data acquired by the imaging data acquisition device, a printing method used to produce the printed surface of the printed product for which the image is captured by the imaging data acquisition device. The determination device selects a plurality of determination areas included in the captured image from the imaging data acquired by the imaging data acquisition device, acquires determination data based on a line-segment image included in each of the selected plurality of determination areas, compares the acquired determination data between two determination areas, and acquires, based on a result of the comparison, a determination value for determining a printing method used to produce the printed surface of the printed product, and determines, based on the acquired determination value, a printing method used to produce the printed surface of the printed product.

In the determination system according to the embodiment of the present disclosure, the line-segment image may be a plurality of line-segment images arranged in parallel at regular intervals.

In the determination system according to the embodiment of the present disclosure, the determination device may determine, based on the result of the comparison, whether the printed product is a printed product printed by a printing method using a plate or a printed product printed by a printing method using a printer that performs printing through scanning using a driving system.

In the determination system according to the embodiment of the present disclosure, the line-segment image may be a line-segment image that is not horizontal or vertical to a scanning direction of the printer in a case where the printed product is a printed product printed with the printer.

In the determination system according to the embodiment of the present disclosure, the determination device may determine that the printed product is a printed product printed with the printer in a case where the determination value is greater than or equal to a preset determination threshold, and determine that the printed product is a printed product printed with the plate in a case where the determination value is less than the determination threshold.

In the determination system according to the embodiment of the present disclosure, the printing method using the printer may be printing using an area coverage modulation method such as inkjet printing, or printing using a thermal transfer method such as sublimation transfer.

In the determination system according to the embodiment of the present disclosure, the determination device may select the plurality of determination areas by designating relative coordinates on the printed surface of the printed product in the captured image corresponding to the acquired imaging data.

In the determination system according to the embodiment of the present disclosure, the determination device may exclude, from a determination target, a determination area containing a predetermined percentage or more of a color other than a predetermined color among the selected plurality of determination areas.

In the determination system according to the embodiment of the present disclosure, the determination device may exclude, from the determination target, a determination area in which a character is printed among the selected plurality of determination areas.

In the determination system according to the embodiment of the present disclosure, the determination device may adjust a size of the determination area to a size such that the determination area has no stain or dust.

In the determination system according to the embodiment of the present disclosure, the determination device may binarize a gradation of the predetermined color in a plurality of pixel regions constituting the determination area by using as a reference a binarization threshold suitable for each determination area to acquire binarized binary data of the determination area, and set the acquired binary data as the determination data.

In the determination system according to the embodiment of the present disclosure, the determination device may compare pieces of the binary data of two determination areas included in the determination target at an overlapping position.

In the determination system according to the embodiment of the present disclosure, the determination device may set the two determination areas included in the determination target to have the same size, and compare the pieces of binary data in the two determination areas set to have the same size.

In the determination system according to the embodiment of the present disclosure, the determination device may exclude, from a determination target, a determination area determined to have low effectiveness as a result of determination of effectiveness of the determination area among the selected plurality of determination areas.

In the determination system according to the embodiment of the present disclosure, the determination device may determine a determination area including a break of the line-segment image among the selected plurality of determination areas to be the area having low effectiveness, and exclude the determination area from the determination target.

In the determination system according to the embodiment of the present disclosure, the determination device may compare pieces of the binary data of the plurality of determination areas that are included in the determination target in a round-robin fashion, calculate a difference between the compared pieces of binary data of the plurality of determination areas, and calculate the determination value, based on at least one of a sum, average, or deviation of obtained difference data.

In the determination system according to the embodiment of the present disclosure, the imaging data acquisition device may be a mobile phone or a digital camera including an image sensor that acquires the imaging data of an imaging image of the printed surface of the printed product.

In the determination system according to the embodiment of the present disclosure, the printed product may be an original that is printed with the plate, or the printed product may be a counterfeit that is printed with the printer, and the determination device may determine, based on the result of the comparison, whether the printed product is an original printed product printed by the printing method using a plate or a counterfeit printed product printed by the printing method using a printer.

In the determination system according to the embodiment of the present disclosure, the determination device may receive the imaging data acquired by the imaging data acquisition device via the Internet.

In the determination system according to the embodiment of the present disclosure, the determination device may transmit a determination result of a printing method used to produce the printed surface of the printed product to an external device via the Internet.

In the determination system according to the embodiment of the present disclosure, the determination device may transmit a determination result of a printing method used to produce the printed surface of the printed product to the imaging data acquisition device via the Internet.

In the determination system according to the embodiment of the present disclosure, the printed product may be a voucher or a certificate document such as a gift certificate, a bill, a driver's license, a basic resident registration card, a residence card, a special permanent resident certificate, or a passport.

An embodiment of the present disclosure provides a control method for a determination system including an imaging data acquisition device that captures an image of a printed surface of a printed product to acquire imaging data of the captured image, and a determination device that determines, based on the imaging data acquired by the imaging data acquisition device, a printing method used to produce the printed surface of the printed product for which the image is captured by the imaging data acquisition device. The control method includes, by the determination device, selecting a plurality of determination areas included in the captured image from the imaging data acquired by the imaging data acquisition device, acquiring determination data based on a line-segment image included in each of the selected plurality of determination areas, comparing the acquired determination data between two determination areas, acquiring, based on a result of the comparison, a determination value for determining a printing method used to produce the printed surface of the printed product, and determining, based on the acquired determination value, a printing method used to produce the printed surface of the printed product.

An embodiment of the present disclosure provides a determination device to be used in a determination system including an imaging data acquisition device that captures an image of a printed surface of a printed product to acquire imaging data of the captured image, the determination device being configured to determine, based on the imaging data acquired by the imaging data acquisition device, a printing method used to produce the printed surface of the printed product for which the image is captured by the imaging data acquisition device. The determination device selects a plurality of determination areas included in the captured image from the imaging data acquired by the imaging data acquisition device, acquires determination data based on a line-segment image included in each of the selected plurality of determination areas, compares the acquired determination data between two determination areas, and acquires, based on a result of the comparison, a determination value for determining a printing method used to produce the printed surface of the printed product, and determines, based on the acquired determination value, a printing method used to produce the printed surface of the printed product.

An embodiment of the present disclosure provides a control method for a determination device to be used in a determination system including an imaging data acquisition device that captures an image of a printed surface of a printed product to acquire imaging data of the captured image, the determination device being configured to determine, based on the imaging data acquired by the imaging data acquisition device, a printing method used to produce the printed surface of the printed product for which the image is captured by the imaging data acquisition device. The control method includes, by the determination device, selecting a plurality of determination areas included in the captured image from the imaging data acquired by the imaging data acquisition device, acquiring determination data based on a line-segment image included in each of the selected plurality of determination areas, comparing the acquired determination data between two determination areas, acquiring, based on a result of the comparison, a determination value for determining a printing method used to produce the printed surface of the printed product, and determining, based on the acquired determination value, a printing method used to produce the printed surface of the printed product.

An embodiment of the present disclosure provides a program to be executed by a determination device to be used in a determination system including an imaging data acquisition device that captures an image of a printed surface of a printed product to acquire imaging data of the captured image, the determination device including a computer, the determination device being configured to determine, based on the imaging data acquired by the imaging data acquisition device, a printing method used to produce the printed surface of the printed product for which the image is captured by the imaging data acquisition device. The program causes the computer to execute processing including, by the determination device, selecting a plurality of determination areas included in the captured image from the imaging data acquired by the imaging data acquisition device, acquiring determination data based on a line-segment image included in each of the selected plurality of determination areas, comparing the acquired determination data between two determination areas, acquiring, based on a result of the comparison, a determination value for determining a printing method used to produce the printed surface of the printed product, and determining, based on the acquired determination value, a printing method used to produce the printed surface of the printed product.

According to embodiments of the present disclosure, it is possible to determine whether a printed product is a printed product printed by a printing method using a plate or a printed product printed by a printing method using a printer that performs printing through scanning using a driving system.

BRIEF DESCRIPTION OF DRAWINGS

FIG. 9A is a diagram illustrating an example of a process T for performing alignment such that binarized line-segment images LV included in the two determination areas D1 and D4, which are included in the determination target, can overlap each other and setting the two determination areas D1 and D4, which are included in the determination target, to have the same size.

DESCRIPTION OF EMBODIMENTS

Figure 1:
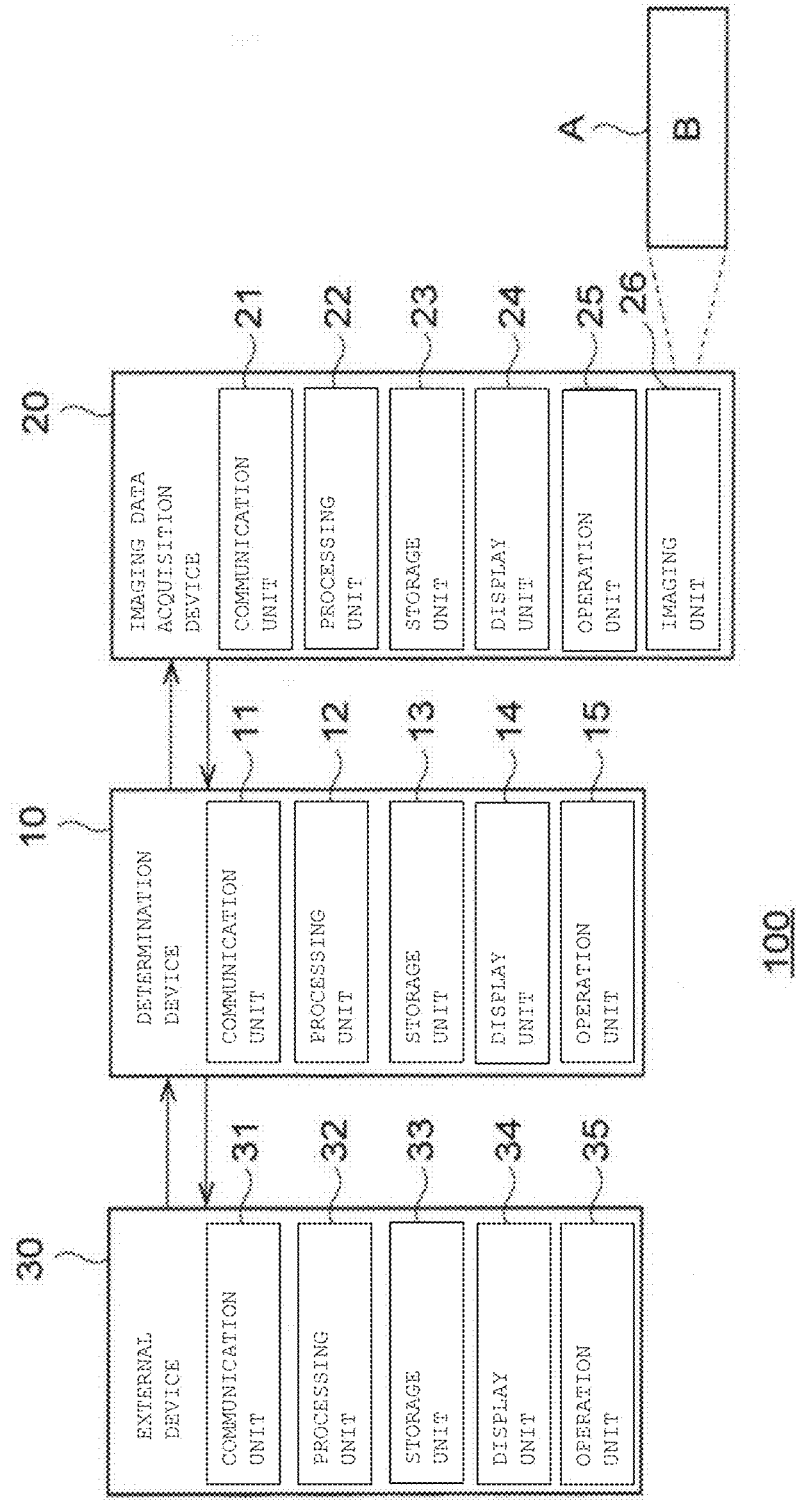
FIG. 1 is a configuration diagram illustrating a configuration of a determination system 100 according to an embodiment.

The following describes a configuration of a determination device and a control method therefor according to embodiments of the present disclosure in detail with reference to the drawings. Embodiments described below are examples of embodiments of the present disclosure, and the present disclosure should not be construed as being limited to these embodiments. As used herein, terms such as "parallel" and "orthogonal", values of length and angle, and the like used to specify shapes and geometric conditions and degrees thereof are not limited to exact meanings, and are construed to the extent that similar functions can be expected. In addition, in the drawings referred to in the embodiments, the same portions or portions having similar functions are assigned the same reference numerals or similar reference numerals, and repeated descriptions thereof are omitted in some cases. In addition, dimensional ratios in the drawings may be different from actual ratios for convenience of description, or a portion of the configuration may be omitted from the drawings.

The following describes an embodiment of the present disclosure with reference to FIGS. 1 to 9B.

[Determination System]

Figure 2:
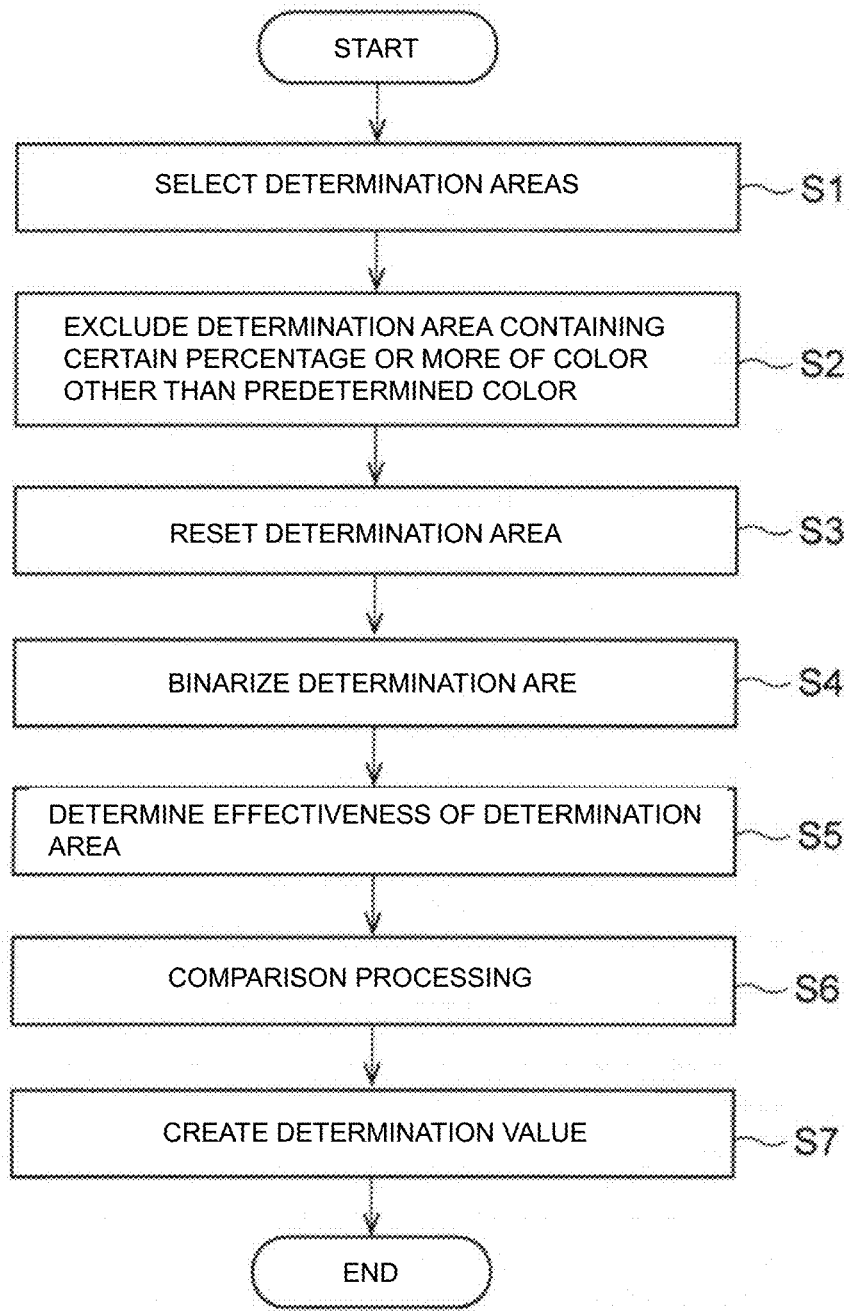
FIG. 2 is a flowchart illustrating an example control method for the determination system 100 (determination device 10) illustrated in FIG. 1.

FIG. 1 is a configuration diagram illustrating a configuration of a determination system 100 according to an embodiment. FIG. 2 is a flowchart illustrating an example control method for the determination system 100 (determination device 10) illustrated in FIG. 1. The process illustrated in FIG. 2 is implemented mainly by a processing unit 12 of the determination device 10 executing a program prepared in advance.

For example, as illustrated in FIG. 1, the determination system 100 includes the determination device 10, an imaging data acquisition device 20, and an external device 30. In the determination system 100 illustrated in FIG. 1, the external device 30 may be omitted as necessary.

[Imaging Data Acquisition Device]

The imaging data acquisition device 20 is configured to capture an image of a printed surface B of a printed product A and acquire imaging data of the captured image. The imaging data acquired by the imaging data acquisition device 20 is transmitted to the processing unit 12 of the determination device 10 through a communication unit 21 of the imaging data acquisition device 20 and a communication unit 11 of the determination device 10 via wireless communication such as the Internet. The printed product A is, for example, a gift certificate, a bill, a driver's license, a basic resident registration card, a residence card, a special permanent resident certificate, a passport, or the like.

For example, as illustrated in FIG. 1, the imaging data acquisition device 20 includes the communication unit 21, a processing unit 22, a storage unit 23, a display unit 24, an operation unit 25, and an imaging unit 26. The components of the imaging data acquisition device 20 illustrated in FIG. 1 are illustrative, and some of the components may be omitted as necessary, or any other component may be added.

The communication unit 21 is configured to transmit and receive predetermined data and the like to and from the communication unit 11 of the determination device 10 via wireless communication such as the Internet. If necessary, the communication unit 21 may be configured to transmit and receive predetermined data and the like to and from the communication unit 11 via wired communication.

The processing unit 22 is constituted by, for example, a computer such as a CPU and is configured to execute processing necessary for the imaging data acquisition device 20, including control of the operation of the imaging unit 26.

The storage unit 23 stores, for example, a program of processing to be executed by the processing unit 22 of the imaging data acquisition device 20 and data necessary for the processing. The storage unit 23 is configured to temporarily save imaging data generated by the imaging unit 26.

The display unit 24 is, for example, a display that displays content and the like executed by the processing unit 22 of the imaging data acquisition device 20.

The operation unit 25 is, for example, an input device to be operated by the user of the imaging data acquisition device 20, and the imaging data acquisition device 20 is configured to cause the processing unit 22 to execute processing corresponding to the operation.

The imaging unit 26 is configured to capture an image of the printed surface B of the printed product A and acquire imaging data of the captured image. The imaging unit 26 is, for example, an image sensor.

The imaging data acquisition device 20 is, for example, a mobile phone (smartphone) or a digital camera including an image sensor (the imaging unit 26) that acquires imaging data of an imaging image of the printed surface B of the printed product A. The imaging data is, for example, gradation data of RGB colors.

[Determination Device]

The determination device 10 is configured to determine a printing method used to produce the printed surface B of the printed product A, for which an image is captured by the imaging data acquisition device 20, on the basis of the imaging data acquired by the imaging data acquisition device 20.

For example, as illustrated in FIG. 2, the determination device 10 is configured to select a plurality of determination areas included in the captured image from the imaging data acquired by the imaging data acquisition device 20 (step S1 in FIG. 2).

Then, the determination device 10 is configured to acquire (calculate) determination data based on a line-segment image included in each of the selected plurality of determination areas, compare the acquired determination data between two determination areas, and acquire (calculate), based on the result of the comparison, a determination value for determining a printing method used to produce the printed surface B of the printed product A (steps S2 to S7 in FIG. 2).

Then, the determination device 10 is configured to determine, based on the acquired determination value, a printing method used to produce the printed surface B of the printed product A.

For example, as illustrated in FIG. 1, the determination device 10 includes the communication unit 11, the processing unit 12, a storage unit 13, a display unit 14, and an operation unit 15. The components of the determination device 10 illustrated in FIG. 1 are illustrative, and some of the components may be omitted as necessary, or any other component may be added.

The communication unit 11 is configured to transmit and receive predetermined data and the like to and from the communication unit 21 of the imaging data acquisition device 20 or a communication unit 31 of the external device 30 via wireless communication such as the Internet. If necessary, the communication unit 11 may be configured to transmit and receive predetermined data and the like to and from the communication units 21 and 31 via wired communication.

The display unit 14 is, for example, a display that displays the result of determination executed by the processing unit 12 of the determination device 10.

The operation unit 15 is an input device to be operated by the user of the determination device 10, and the determination device 10 is configured to cause the processing unit 12 to execute processing corresponding to the operation.

The processing unit 12 is constituted by, for example, a computer such as a CPU and is configured to execute processing necessary for the determination device 10.

The processing unit 12 is configured to receive the imaging data acquired by the imaging data acquisition device 20 using the communication unit 11 via the Internet.

The processing unit 12 is configured to, for example, select a plurality of determination areas included in the captured image from the imaging data acquired by the imaging data acquisition device 20 (step S1 in FIG. 2), acquire (calculate) determination data based on a line-segment image included in each of the selected plurality of determination areas, compare the acquired determination data between two determination areas, acquire (calculate), based on the result of the comparison, a determination value for determining a printing method used to produce the printed surface B of the printed product A (steps S2 to S7 in FIG. 2), and determine, based on the acquired determination value, a printing method used to produce the printed surface B of the printed product A.

The storage unit 13 stores a program of processing to be executed by the processing unit 12 of the determination device 10 and data necessary for the processing.

The program is a program to be executed by the determination device 10 including at least a computer (the processing unit 12) and is configured to cause the computer (the processing unit 12) to execute processing including selecting a plurality of determination areas included in the captured image from the imaging data acquired by the imaging data acquisition device 20 (step S1 in FIG. 2), acquiring (calculates) determination data based on a line-segment image included in each of the selected plurality of determination areas, comparing the acquired determination data between two determination areas, acquiring (calculating), based on the result of the comparison, a determination value for determining a printing method used to produce the printed surface B of the printed product A (steps S2 to S7 in FIG. 2), and determining, based on the acquired determination value, a printing method used to produce the printed surface B of the printed product A.

When the determination value described above indicates that an undulation degree indicating the degree of undulations (curves) of a line-segment image is greater than or equal to a preset determination threshold (for example, the line-segment image undulates or a portion of the line-segment image is curved), the processing unit 12 of the determination device 10 is configured to determine that the printed surface B of the printed product A is a printed surface printed with a printer that performs printing by scanning a printing unit (a printhead and a paper feed mechanism) using a driving system (for example, a motor).

On the other hand, when the determination value described above indicates that the undulation degree described above is less than the determination threshold (for example, the line-segment image is a substantially straight line), the processing unit 12 of the determination device 10 is configured to determine that the printed surface B of the printed product A is a printed surface printed with a plate.

More specifically, for example, as illustrated in FIG. 2, the processing unit 12 of the determination device 10 is configured to select a plurality of determination areas by designating relative coordinates on the printed surface B of the printed product A representing the captured image of the acquired imaging data (step S1 in FIG. 2).

Then, the processing unit 12 of the determination device 10 is configured to exclude, from the determination target, a determination area containing a predetermined percentage or more of a color other than a predetermined color among the selected plurality of determination areas (step S2 in FIG. 2).

The processing unit 12 of the determination device 10 is configured to exclude, from the determination target, a determination area in which a character is printed among the selected plurality of determination areas (step S2 in FIG. 2).

Then, the processing unit 12 of the determination device 10 is configured to adjust the size of each determination area to a size such that the determination area has no stain or dust to reset the determination area (step S3 in FIG. 2).

Then, the processing unit 12 of the determination device 10 is configured to binarize the gradation of the predetermined color in a plurality of pixel regions constituting the determination area by using as a reference a (preset) binarization threshold suitable for each determination area to acquire binarized binary data of the determination area, and set the acquired binary data as the determination data described above (step S4 in FIG. 2).

Then, the processing unit 12 of the determination device 10 is configured to exclude, from the determination target, a determination area determined to have low effectiveness as a result of determination of the effectiveness of the determination area among the selected plurality of determination area (step S5 in FIG. 2).

In particular, the processing unit 12 of the determination device 10 is configured to, for example, set a determination area including a break of a line-segment image L among the selected plurality of determination areas to be an area with low effectiveness and exclude the determination area from the determination target.

Then, the processing unit 12 of the determination device 10 is configured to perform alignment so that line-segment images in two determination areas included in the determination target can overlap each other (processing for aligning the axes of coordinates in the respective determination areas), and compare pieces of binary data (determination data) of the two determination areas included in the determination target at an overlapping position (coordinates) (step S6 in FIG. 2).

The alignment process and the effectiveness determination process described above may be performed in reverse order, and it is sufficient that at least the comparison process be executed after these processes.

The processing unit 12 of the determination device 10 may be configured to set two determination areas included in the determination target to have the same size, and compare pieces of binary data (determination data) of the two determination areas set to have the same size.

Then, the processing unit 12 of the determination device 10 is configured to compare pieces of binary data of a plurality of determination areas included in the determination target in a round-robin fashion, calculate differences between the compared pieces of binary data of the plurality of determination areas, and calculate the determination value described above on the basis of at least one of the sum, average, or deviation of obtained difference data (step S7 in FIG. 2).

Then, the processing unit 12 of the determination device 10 is configured to determine, based on the comparison result described above, whether the printed product A is an original printed product A printed by a printing method using the plate described above or a counterfeit printed product A printed by a printing method using the printer described above.

Then, the processing unit 12 of the determination device 10 is configured to transmit the determination result of the printing method used to produce the printed surface B of the printed product A to the imaging data acquisition device 20 via the Internet.

The processing unit 12 of the determination device 10 may be configured to transmit the determination result of the printing method used to produce the printed surface B of the printed product A to the external device 30 via the Internet by using the communication unit 11.

[External Device]

The external device 30 is, for example, a server that executes necessary processing on the basis of the determination result or the like received from the determination device 10.

For example, as illustrated in FIG. 1, the external device 30 includes the communication unit 31, a processing unit 32, a storage unit 33, a display unit 34, and an operation unit 35. The components of the external device 30 illustrated in FIG. 1 are illustrative, and some of the components may be omitted as necessary, or any other component may be added.

The communication unit 31 is configured to transmit and receive predetermined data and the like to and from the communication unit 11 of the determination device 10 via wireless communication such as the Internet. If necessary, the communication unit 31 may be configured to transmit and receive predetermined data and the like to and from the communication unit 11 via wired communication.

The processing unit 32 is constituted by, for example, a computer such as a CPU and is configured to execute processing necessary for the external device 30.

The storage unit 33 stores a program of processing to be executed by the processing unit 32 of the external device 30 and data necessary for the processing.

The display unit 34 is, for example, a display that displays content and the like executed by the processing unit 32 of the external device 30.

The operation unit 35 is an input device to be operated by the user of the external device 30, and the external device 30 is configured to cause the processing unit 32 to execute processing corresponding to the operation.

[Basic Principle of Determination Method]

The basic principle of the determination method according to this embodiment will now be described. As described above, the determination system 100 according to this embodiment is configured to determine the authenticity of a printed product such as a voucher or an identification card by determining whether the printed product is a printed product printed by a printing method using a plate or a printed product printed by a printing method using a printer that performs printing through scanning using a driving system.

For example, the printed product A, which is original, is printed with a plate on offset printing or the like.

In contrast, the printed product A, which is counterfeit, is generally manufactured using, for example, imaging data obtained by imaging of the original printed product A using a scanner by printing the printed surface of the printed product A with a printer that performs printing by scanning a printing unit (a printhead and a paper feed mechanism) using a driving system (for example, a motor).

Accordingly, the determination device according to this embodiment determines whether a printed product is a printed product printed by a printing method using a plate or a printed product printed by a printing method using a printer that performs printing through scanning using a driving system, and determines the authenticity of a voucher, an identification card, or the like.

The printing method using a printer includes printing using an area coverage modulation method such as inkjet printing, printing using a thermal transfer method such as sublimation transfer, or the like.

Figure 3A:
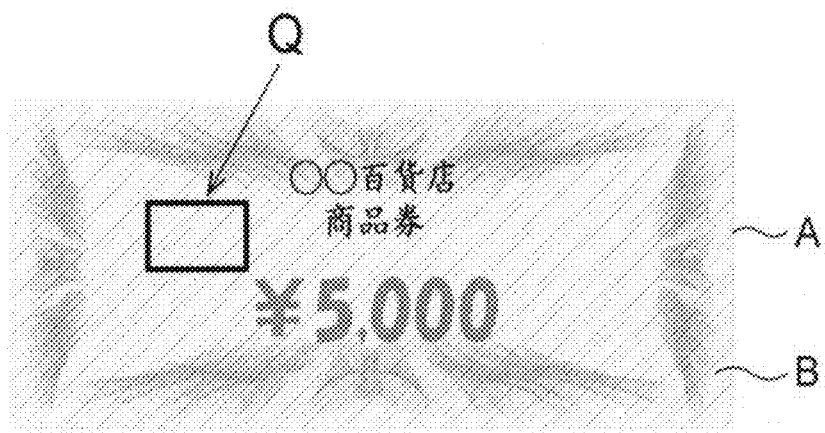
FIG. 3A is a diagram illustrating an example of a printed surface B of a printed product A.
Figure 3B:
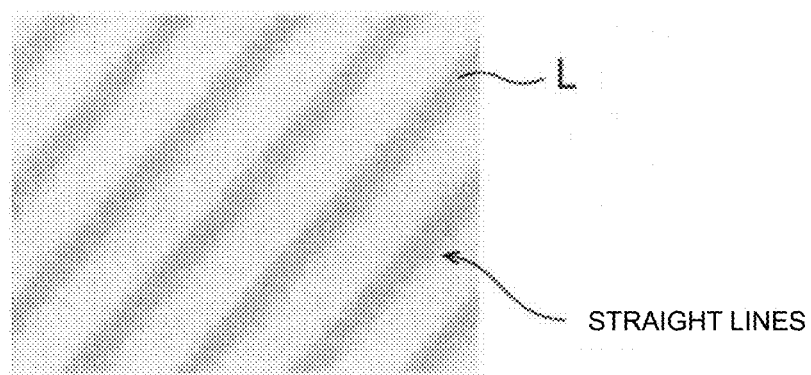
FIG. 3B is an enlarged view of line-segment images L in an area Q on the printed surface B of the printed product A printed with a plate.
Figure 3C:
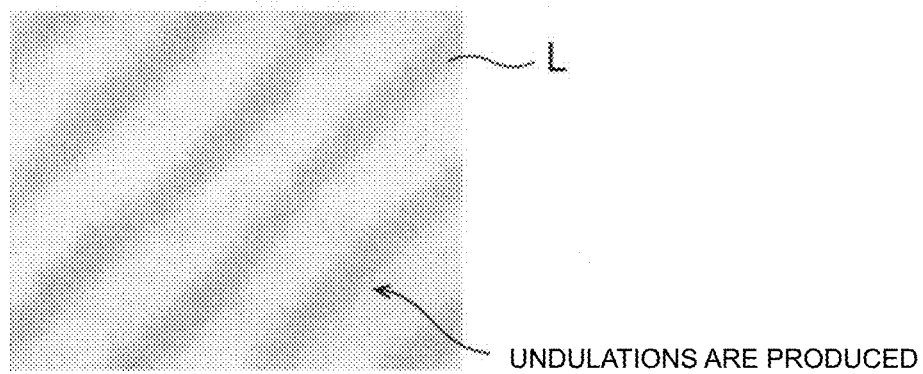
FIG. 3C is an enlarged view of line-segment images L in the area Q on the printed surface B of the printed product A printed with a printer.

FIG. 3A is a diagram illustrating an example of the printed surface B of the printed product A. FIG. 3B is an enlarged view of images of line segments L in an area Q on the printed surface B of the printed product A printed with a plate. FIG. 3C is an enlarged view of the line-segment images L in the area Q on the printed surface B of the printed product A printed with a printer.

For example, as illustrated in FIG. 3A, the printed surface B of the printed product A, which is a gift certificate, includes the area Q having line segments.

For example, as illustrated in FIG. 3B, when the printed product A is an original printed by a printing method using a plate, the line-segment images L are straight lines, and no undulations or the like is produced. Since the printed product A is produced using a printing method using a plate such as offset printing, line-segment images are set as straight lines on a plate, and as a result, the line-segment images printed on the printed surface of a printed product are also exactly straight lines.

In contrast, for example, as illustrated in FIG. 3C, when the printed product A is a counterfeit printed by printing with a printer, the line-segment images L undulate, or a portion of the line-segment images L is curved.

A description will now be given of the principle that undulations or the like are produced in the line-segment images L when the printed product A is a counterfeit printed by printing with a printer.

Figure 4A:
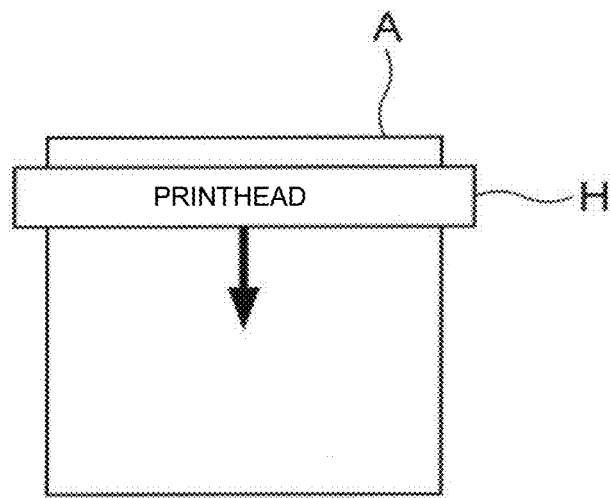
FIG. 4A is a diagram illustrating an example in which a line segment is printed on a product to be printed by moving (scanning) a printhead H of a printer with constant velocity.
Figure 4B:
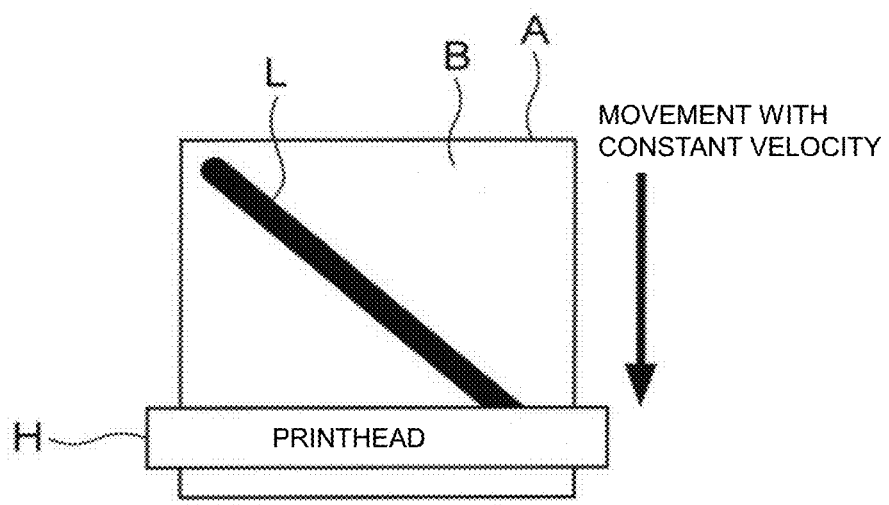
FIG. 4B is a diagram, continued from FIG. 4A, illustrating the example in which the line segment is printed on the product to be printed by moving (scanning) the printhead H of the printer with constant velocity.
Figure 5A:
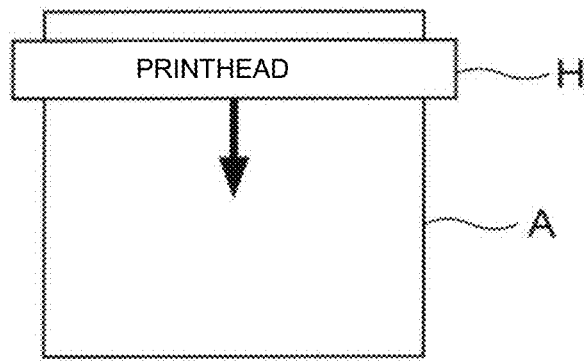
FIG. 5A is a diagram illustrating an example in which a line segment is printed on a product to be printed with a temporarily reduced scanning speed of the printhead H of the printer.
Figure 5B:
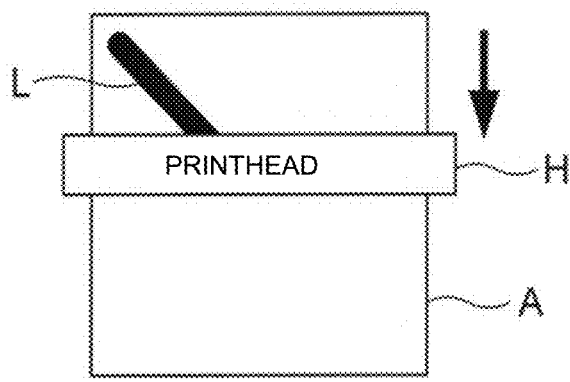
FIG. 5B is a diagram, continued from FIG. 5A, illustrating the example in which the line segment is printed on the product to be printed with a temporarily reduced scanning speed of the printhead H of the printer.
Figure 5C:
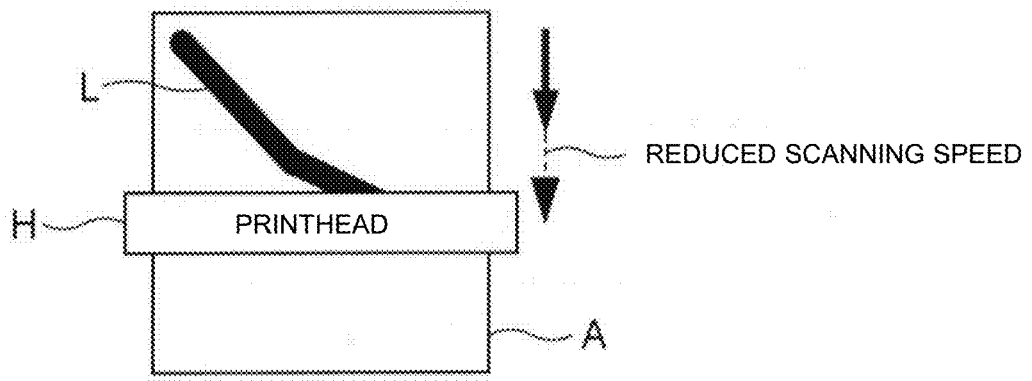
FIG. 5C is a diagram, continued from FIG. 5B, illustrating the example in which the line segment is printed on the product to be printed with a temporarily reduced scanning speed of the printhead H of the printer.
Figure 5D:
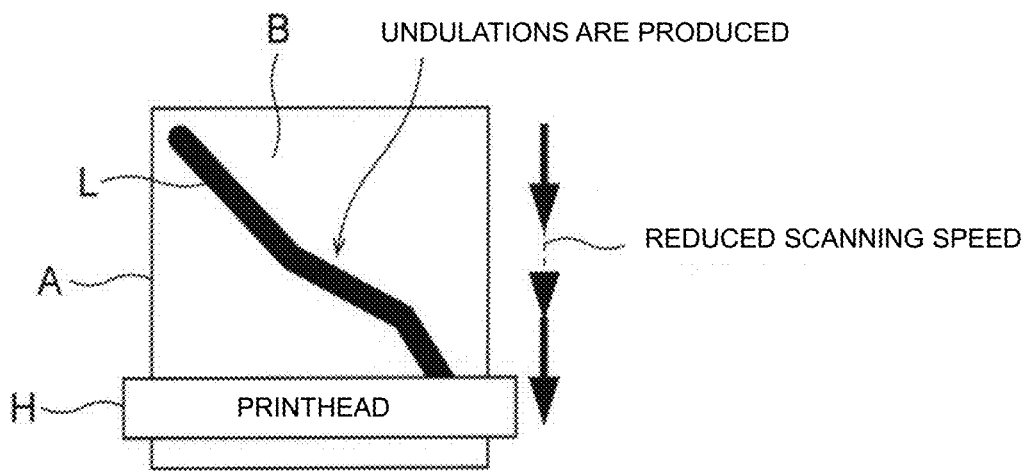
FIG. 5D is a diagram, continued from FIG. 5C, illustrating the example in which the line segment is printed on the product to be printed with a temporarily reduced scanning speed of the printhead H of the printer.

FIG. 4A is a diagram illustrating an example in which a line segment is printed on a product to be printed by moving (scanning) a printhead H of a printer with constant velocity. FIG. 4B is a diagram, continued from FIG. 4A, illustrating the example in which the line segment is printed on the product to be printed by moving (scanning) the printhead H of the printer with constant velocity. FIG. 5A is a diagram illustrating an example in which a line segment is printed on a product to be printed with a temporarily reduced scanning speed of the printhead H of the printer. FIG. 5B is a diagram, continued from FIG. 5A, illustrating the example in which the line segment is printed on the product to be printed with a temporarily reduced scanning speed of the printhead H of the printer. FIG. 5C is a diagram, continued from FIG. 5B, illustrating the example in which the line segment is printed on the product to be printed with a temporarily reduced scanning speed of the printhead H of the printer. FIG. 5D is a diagram, continued from FIG. 5C, illustrating the example in which the line segment is printed on the product to be printed with a temporarily reduced scanning speed of the printhead H of the printer.

As described above, the printer is configured to perform printing by scanning a printing unit (a printhead and a paper feed mechanism) by using a driving system (for example, a motor).

For example, as illustrated in FIGS. 4A and 4B, in a case where the printhead H of the printer scans so as to move with constant velocity, a straight-line-shaped line-segment image L is printed on the printed surface B of the printed product A.

However, the printhead H of the printer or a paper feed mechanism for the printed product A is scanned using a mechanical mechanism such as a motor and may not be scanned with constant velocity. In addition, the following case is predicted: When imaging data of the printed product A is loaded into a printer through imaging using a scanner, the scanner may fail to scan with constant velocity, and the line-segment image may not be scanned as a straight line.

In this case, as illustrated in FIGS. 5A to 5D, if a line segment is printed on a product to be printed with a temporarily reduced scanning speed of the printhead H of the printer, the line-segment image L undulates.

As described above, during the rendering by the printer, the use of the driving system (motor), such as the paper feed mechanism, such as the paper feed mechanism, causes a fine error. As a result, the line-segment image L, which is an oblique line (line sloped relative to a scan line), undulates.

Likewise, when the printed surface of the original printed product A is scanned by a scanner to create a forged document, a fine error of a driving system of a sensor causes line-segment images that are oblique lines to undulate.

Figure 6:
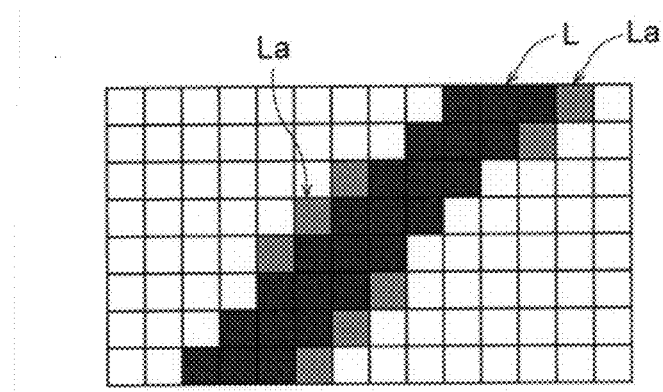
FIG. 6 is a diagram illustrating an example of a line-segment image L on the printed surface B of the printed product A printed with a printer.

FIG. 6 is a diagram illustrating an example of an image of a line segment L on the printed surface B of the printed product A printed with a printer.

For example, as illustrated in FIG. 6, the following case is predicted: The line-segment image L, which is an oblique line formed by interpolations La of pixel regions (dot regions) on a print made by a printer, may be distorted into undulations.

As described above, when the printed product A is a counterfeit printed by printing with a printer, undulations or the like are produced in the line-segment images L.

In contrast, as described above, when the printed product A is an original printed by a printing method using a plate, the line-segment images L are straight lines, and no undulations or the like is produced.

In this embodiment, therefore, it is determined whether a printed product is a printed product printed by a printing method using a plate or a printed product printed by a printing method using a printer that performs printing through scanning using a driving system to determine whether the printed product is original or counterfeit.

As described above, the printing method using a printer is, for example, printing using an area coverage modulation method such as inkjet printing, or printing using a thermal transfer method such as sublimation transfer.

[Control Method for Determination System]

Next, an example of a control method that is a determination method of the determination system 100, in particular, a control method for a determination device, will be described.

Figure 7A:
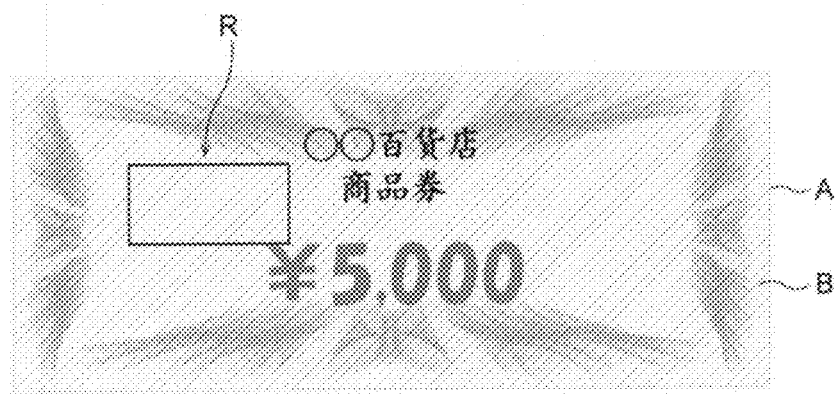
FIG. 7A is a diagram illustrating an example of the printed surface B of the printed product A.
Figure 7B:
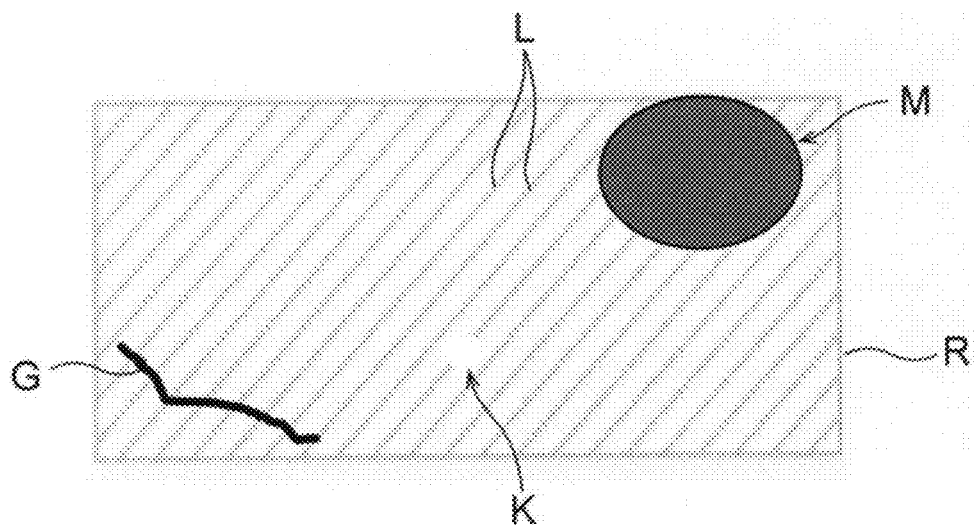
FIG. 7B is a diagram illustrating an example enlarged view of an area R on the printed surface B of the printed product A illustrated in FIG. 7A.

FIG. 7A is a diagram illustrating an example of the printed surface B of the printed product A. FIG. 7B is a diagram illustrating an example enlarged view of an area R on the printed surface B of the printed product A illustrated in FIG. 7A.

For example, as illustrated in FIGS. 7A and 7B, the printed surface B of the printed product A, which is a gift certificate, includes the area R having line segments.

As illustrated in FIGS. 7A and 7B, line-segment images L, which are printed in the area R, are, for example, a plurality of line-segment images arranged in parallel at regular intervals.

For example, as illustrated in FIG. 7B, the area R has a break K of a line-segment image L and also has a stain or dust G. In the area R, furthermore, a color M other than a predetermined color is printed.

When the printed product A is a printed product printed with a printer, the line-segment images L are line-segment images (oblique lines) that are not horizontal or vertical to the scanning direction (printing direction) of the printer. In this case, the undulations or the like described above, which are produced, are particularly noticeable.

Figure 8A:
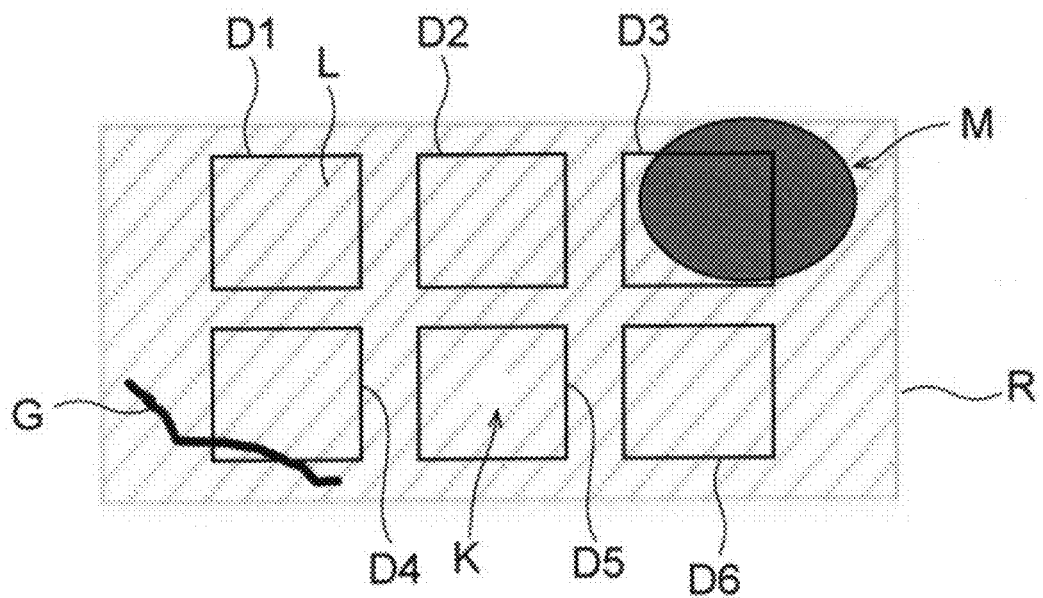
FIG. 8A is a diagram illustrating an example in which a plurality of determination areas D1 to D6 are selected (extracted) in the area R on the printed surface B of the printed product A illustrated in FIG. 7B.

FIG. 8A is a diagram illustrating an example in which a plurality of determination areas D1 to D6 are selected (extracted) in the area R on the printed surface B of the printed product A illustrated in FIG. 7B.

As illustrated in FIG. 8A, the processing unit 12 of the determination device 10 selects the plurality of determination areas D1 to D6 by designating relative coordinates on the printed surface B of the printed product A representing the captured image of the acquired imaging data (corresponding to step S1 in FIG. 2).

In this manner, a plurality of determination areas having a predetermined size are extracted from an area corresponding to oblique line portions for examination.

Figure 8B:
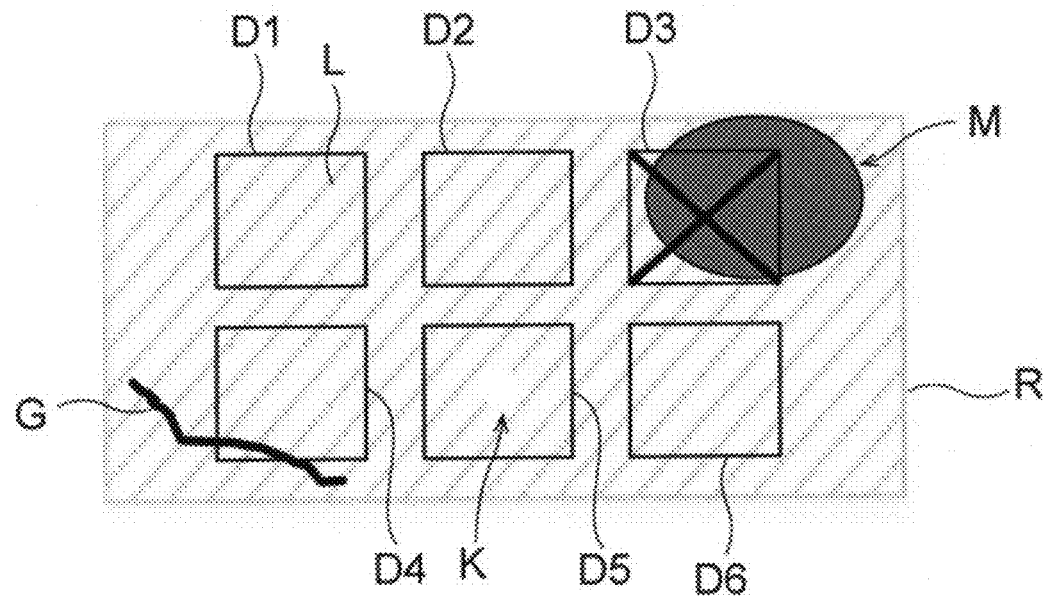
FIG. 8B is a diagram, continued from FIG. 8A, illustrating an example in which the determination area D3 containing a predetermined percentage or more of a color M other than a predetermined color among the selected plurality of determination areas D1 to D6 illustrated in FIG. 8A is excluded from the determination target.

FIG. 8B is a diagram, continued from FIG. 8A, illustrating an example in which the determination area D3 containing a predetermined percentage or more of the color M other than the predetermined color among the selected plurality of determination areas D1 to D6 illustrated in FIG. 8A is excluded from the determination target.

As illustrated in FIG. 8B, the processing unit 12 of the determination device 10 excludes the determination area D3 containing a predetermined percentage or more of the color M other than the predetermined color among the selected plurality of determination areas D1 to D6 from the determination target (corresponding to step S2 in FIG. 2). Further, the processing unit 12 of the determination device 10 may be configured to exclude the determination area D3 in which a character (not illustrated) is printed among the selected plurality of determination areas D1 to D6 from the determination target (corresponding to step S2 in FIG. 2).

Figure 8C:
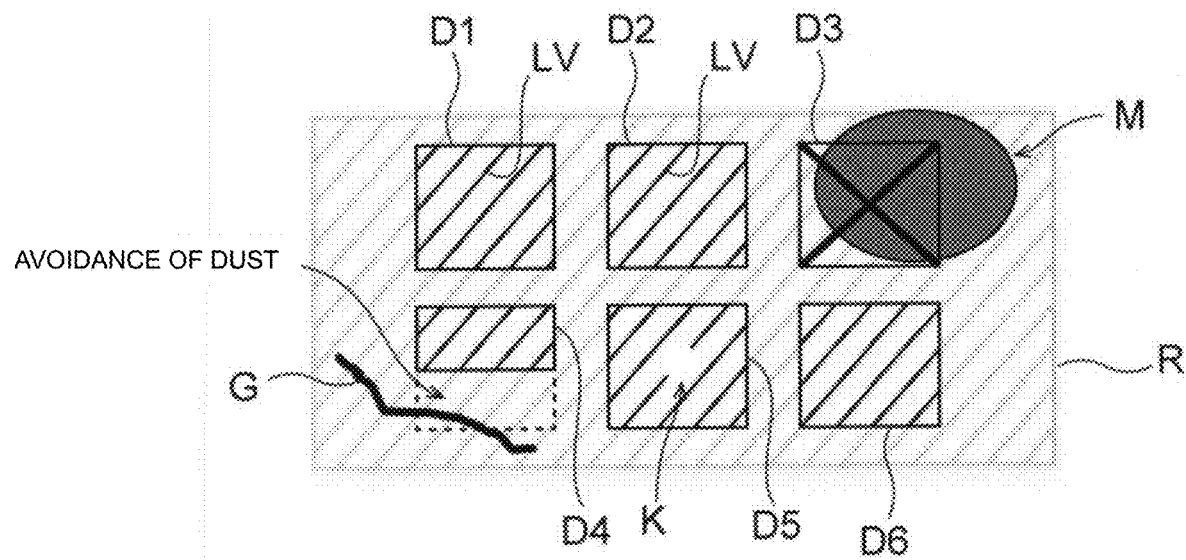
FIG. 8C is a diagram, continued from FIG. 8B, illustrating an example in which the size of the determination area D4 among the selected plurality of determination areas D1 to D6 is adjusted to a size such that the determination area D4 has no stain or dust.

FIG. 8C is a diagram, continued from FIG. 8B, illustrating an example in which the size of the determination area D4 among the selected plurality of determination areas D1 to D6 is adjusted to a size such that the determination area D4 does not have the stain or dust G.

As illustrated in FIG. 8C, the processing unit 12 of the determination device 10 adjusts the size of the determination area D4 to a size such that the determination area D4 does not have the stain or dust G to reset the determination area (corresponding to step S3 in FIG. 2).

As illustrated in FIG. 8C, furthermore, the processing unit 12 of the determination device 10 binarizes the gradation of the predetermined color in a plurality of pixel regions constituting the determination areas D1 to D6 by using as a reference a (preset) binarization threshold suitable for each determination area to acquire binarized binary data of the determination area, and sets the acquired binary data as the determination data described above (corresponding to step S4 in FIG. 2).

Typically known examples of the method for determining a binarization threshold suitable for each determination area include a determination method using a histogram of pixel values in an area.

Figure 8D:
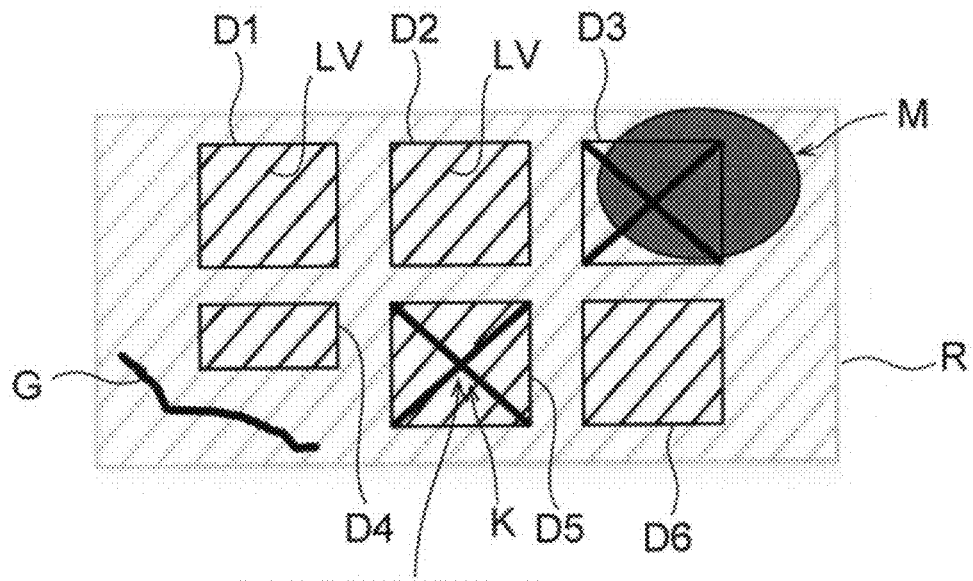
FIG. 8D is a diagram, continued from FIG. 8C, illustrating an example in which the determination area D5 including a break of a line-segment image among the selected plurality of determination areas D1 to D6 is determined to be an area with low effectiveness and is excluded from the determination target.

FIG. 8D is a diagram, continued from FIG. 8C, illustrating an example in which the determination area D5 including a break of a line-segment image among the selected plurality of determination areas D1 to D6 is determined to be an area with low effectiveness and is excluded from the determination target.

As illustrated in FIG. 8D, the processing unit 12 of the determination device 10 excludes the determination area D5, which is determined to have low effectiveness as a result of determination of the effectiveness of the determination area among the selected plurality of determination areas D1 to D6, from the determination target (corresponding to step S5 in FIG. 2).

More specifically, the processing unit 12 of the determination device 10 determines, for example, the determination area D5 including the break K of the line-segment image L among the selected plurality of determination areas D1 to D6 to be an area with low effectiveness and excludes the determination area D5 from the determination target.

In this manner, to avoid erroneous determination, a determination area including a scratch or a stain may be excluded from images of selected determination areas.

Figure 9B:
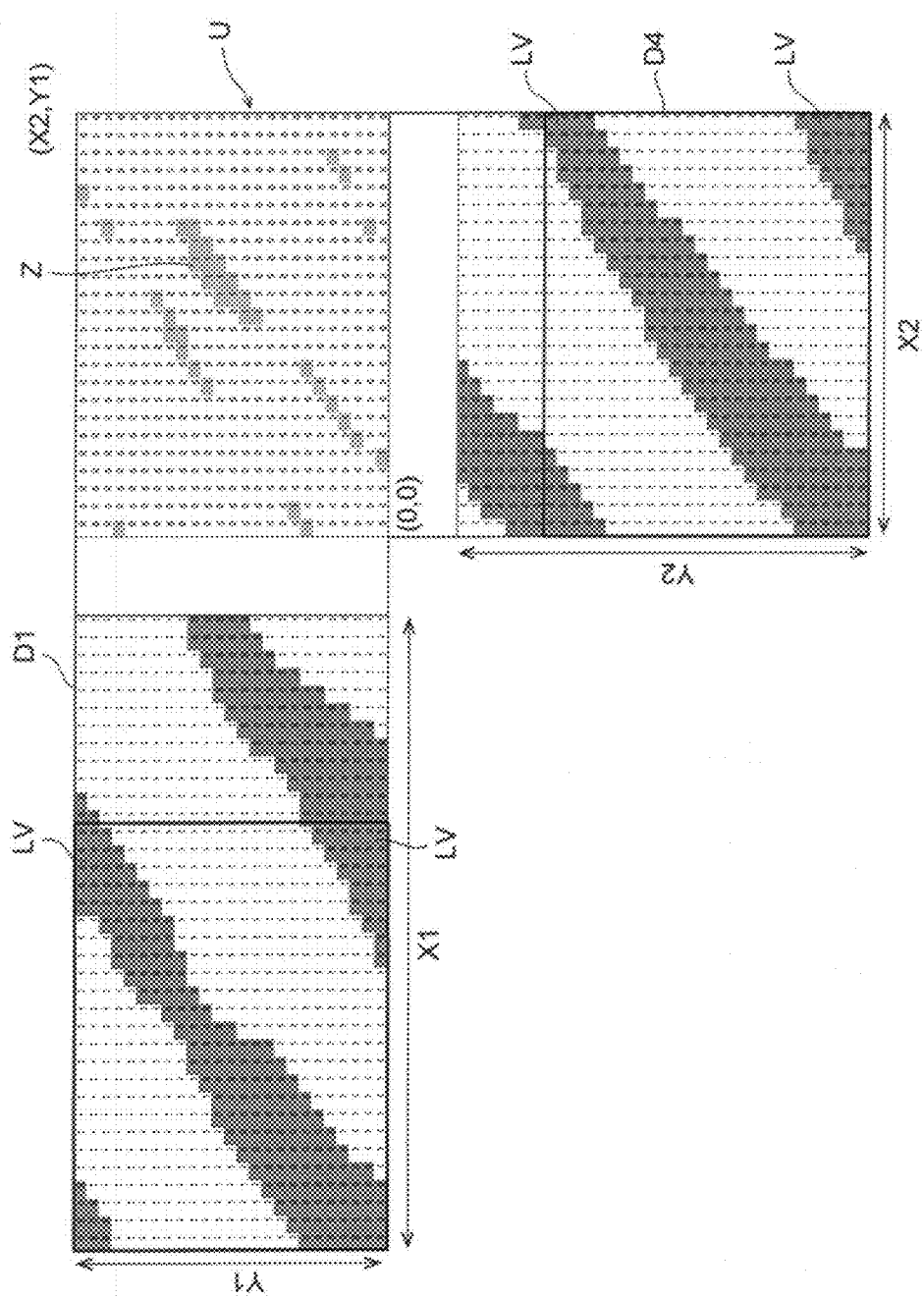
FIG. 9B is a diagram, continued from FIG. 9A, illustrating an example of a process U for comparing pieces of binary data (determination data) subjected to the process for performing the alignment and setting the two determination areas D1 and D4, which are included in the determination target, to have the same size and calculating a difference Z between the pieces of binary data of the two determination areas D1 and D4.

FIG. 9A is a diagram illustrating an example of a process T for performing alignment such that binarized line-segment images LV included in the two determination areas D1 and D4, which are included in the determination target, can overlap each other and setting the two determination areas D1 and D4, which are included in the determination target, to have the same size. FIG. 9B is a diagram, continued from FIG. 9A, illustrating an example of a process U for comparing pieces of binary data (determination data) subjected to the process for performing the alignment and setting the two determination areas D1 and D4, which are included in the determination target, to have the same size and calculating a difference Z between the pieces of binary data of the two determination areas D1 and D4.

As illustrated in FIGS. 9A and 9B, after step S5 described above, the processing unit 12 of the determination device 10 performs alignment such that line-segment images (the "0" portions of binary data) LV in the two determination areas D1 and D4, which are included in the determination target, can overlap each other (processing for aligning the axes of coordinates in the respective determination areas), and compares pieces of binary data (determination data) of the two determination areas D1 and D4, which are included in the determination target, at an overlapping position (coordinates) (corresponding to step S6 in FIG. 2).

In particular, the processing unit 12 of the determination device 10 sets the two determination areas D1 and D4, which are included in the determination target, to have the same size, and compares pieces of binary data (determination data) of the two determination areas D1 and D4 set to have the same size (corresponding to step S6 in FIG. 2).

After step S6 described above, the processing unit 12 of the determination device 10 compares pieces of binary data of the plurality of determination areas D1, D2, D4, and D6, which are included in the determination target, in a round-robin fashion, calculates differences Z between the compared pieces of binary data of the plurality of determination areas, and calculates a determination value on the basis of at least one of the sum, average, or deviation of the obtained difference data (step S7 in FIG. 2).

For example, when the determination value described above indicates that an undulation degree indicating the degree of undulations (curves) of line-segment images is greater than or equal to a preset determination threshold (for example, the line-segment images undulate or a portion of the line-segment images is curved), the processing unit 12 of the determination device 10 determines that the printed surface B of the printed product A is one printed with a printer that performs printing by scanning a printing unit (a printhead and a paper feed mechanism) using a driving system (for example, a motor).

On the other hand, when the determination value described above indicates that the undulation degree described above is less than the determination threshold (for example, the line-segment images are substantially straight lines), the processing unit 12 of the determination device 10 determines that the printed surface B of the printed product A is one printed with a plate.

In this manner, the determination device 10 determines, based on the comparison result, whether the printed product A is an original printed product A printed by a printing method using the plate described above or a counterfeit printed product A printed by a printing method using the printer described above.

The processing unit 12 of the determination device 10 transmits the determination result of the printing method used to produce the printed surface B of the printed product A to the imaging data acquisition device 20 (mobile phone) via the Internet.

The determination result of the printing method used to produce the printed surface B of the printed product A is displayed on the display unit 24 of the imaging data acquisition device 20 (mobile phone), which enables the user of the imaging data acquisition device 20 (mobile phone) to be informed of the determination result.

Alternatively, the processing unit 12 of the determination device 10 may transmit the determination result of the printing method used to produce the printed surface B of the printed product A to the external device 30 via the Internet by using the communication unit 11.

The determination result of the printing method used to produce the printed surface B of the printed product A is displayed on the display unit 34 of the external device 30, which enables the user of the imaging data acquisition device 20 (mobile phone) to be informed of the determination result.

As described above, according to embodiments of the present disclosure, it is possible to determine whether a printed product is a printed product printed by a printing method using a plate or a printed product printed by a printing method using a printer that performs printing through scanning using a driving system.

While some modifications of the embodiment described above have been described, it is apparent that a plurality of modifications can be used in combination as appropriate.

REFERENCE SIGNS LIST 100 determination system
10 determination device
20 imaging data acquisition device
30 external device
11 communication unit
12 processing unit
13 storage unit
14 display unit
15 operation unit
21 communication unit
22 processing unit
23 storage unit
24 display unit
25 operation unit
26 imaging unit
31 communication unit
32 processing unit
33 storage unit
34 display unit
35 operation unit

The invention claimed is:

1. A determination system comprising:
an imaging data acquisition device that captures an image of a printed surface of a printed product to acquire imaging data of the captured image; and
a determination device that determines, based on the imaging data acquired by the imaging data acquisition device, a printing method used to produce the printed surface of the printed product for which the image is captured by the imaging data acquisition device,
wherein the determination device
selects a plurality of determination areas included in the captured image from the imaging data acquired by the imaging data acquisition device,
acquires determination data based on a line-segment image included in each of the selected plurality of determination areas,
compares the acquired determination data between two determination areas, and acquires, based on a result of the comparison, a determination value for determining a printing method used to produce the printed surface of the printed product, and determines, based on the acquired determination value, a printing method used to produce the printed surface of the printed product.

2. The determination system according to claim 1, wherein the line-segment image comprises a plurality of line-segment images arranged in parallel at regular intervals.

3. The determination system according to claim 1, wherein the determination device determines, based on the result of the comparison, whether the printed product is a printed product printed by a printing method using a plate or a printed product printed by a printing method using a printer that performs printing through scanning using a driving system.

4. The determination system according to claim 3, wherein the line-segment image comprises a line-segment image that is not horizontal or vertical to a scanning direction of the printer in a case where the printed product is a printed product printed with the printer.

5. The determination system according to claim 4, wherein the determination device determines that the printed product is a printed product printed with the printer in a case where the determination value is greater than or equal to a preset determination threshold, and determines that the printed product is a printed product printed with the plate in a case where the determination value is less than the determination threshold.

6. The determination system according to claim 4, wherein the printing method using the printer comprises printing using an area coverage modulation method or printing using a thermal transfer method.

7. The determination system according to claim 3, wherein the printed product is an original that is printed with the plate, or the printed product is a counterfeit that is printed with the printer, and wherein the determination device determines, based on the result of the comparison, whether the printed product is an original printed product printed by the printing method using a plate or a counterfeit printed product printed by the printing method using a printer.

8. The determination system according to claim 1, wherein the determination device selects the plurality of determination areas by designating relative coordinates on the printed surface of the printed product in the captured image corresponding to the acquired imaging data.

9. The determination system according to claim 8, wherein the determination device excludes, from a determination target, a determination area containing a predetermined percentage or more of a color other than a predetermined color among the selected plurality of determination areas.

10. The determination system according to claim 9, wherein the determination device excludes, from the determination target, a determination area in which a character is printed among the selected plurality of determination areas.

11. The determination system according to claim 9, wherein the determination device adjusts a size of the determination area to a size such that the determination area has no stain or dust.

12. The determination system according to claim 9, wherein the determination device binarizes a gradation of the predetermined color in a plurality of pixel regions constituting the determination area by using as a reference a binarization threshold suitable for each determination area to acquire binarized binary data of the determination area, and sets the acquired binary data as the determination data.

13. The determination system according to claim 12, wherein the determination device compares pieces of the binary data of two determination areas included in the determination target at an overlapping position.

14. The determination system according to claim 13, wherein the determination device sets the two determination areas included in the determination target to have the same size, and compares the pieces of binary data in the two determination areas set to have the same size.

15. The determination system according to claim 12, wherein the determination device compares pieces of the binary data of the plurality of determination areas that are included in the determination target in a round-robin fashion, calculates a difference between the compared pieces of binary data of the plurality of determination areas, and calculates the determination value, based on at least one of a sum, average, or deviation of obtained difference data.

16. The determination system according to claim 8, wherein the determination device excludes, from a determination target, a determination area determined to have low effectiveness as a result of determination of effectiveness of the determination area among the selected plurality of determination areas.

17. The determination system according to claim 16, wherein the determination device determines a determination area including a break of the line-segment image among the selected plurality of determination areas to be the area having low effectiveness, and excludes the determination area from the determination target.

18. The determination system according to claim 1, wherein the imaging data acquisition device is a mobile phone or a digital camera including an image sensor that acquires the imaging data of an imaging image of the printed surface of the printed product.

19. The determination system according to claim 1, wherein the determination device receives the imaging data acquired by the imaging data acquisition device via the Internet.

20. The determination system according to claim 1, wherein the determination device transmits a determination result of a printing method used to produce the printed surface of the printed product to an external device via the Internet.

21. The determination system according to claim 1, wherein the determination device transmits a determination result of a printing method used to produce the printed surface of the printed product to the imaging data acquisition device via the Internet.

22. The determination system according to claim 1, wherein the printed product is a certificate document such as a gift certificate, a bill, a driver's license, a basic resident registration card, a residence card, a special permanent resident certificate, a passport, a voucher, or an identification card.

23. A control method for a determination system including an imaging data acquisition device that captures an image of a printed surface of a printed product to acquire imaging data of the captured image, and a determination device that determines, based on the imaging data acquired by the imaging data acquisition device, a printing method used to produce the printed surface of the printed product for which the image is captured by the imaging data acquisition device, the control method comprising, by the determination device:
selecting a plurality of determination areas included in the captured image from the imaging data acquired by the imaging data acquisition device;
acquiring determination data based on a line-segment image included in each of the selected plurality of determination areas;
comparing the acquired determination data between two determination areas, and acquiring, based on a result of the comparison, a determination value for determining a printing method used to produce the printed surface of the printed product; and
determining, based on the acquired determination value, a printing method used to produce the printed surface of the printed product.

24. The control method according to claim 23, wherein the printed product is a certificate document such as a gift certificate, a bill, a driver's license, a basic resident registration card, a residence card, a special permanent resident certificate, a passport, a voucher, or an identification card.

25. A determination device to be used in a determination system including an imaging data acquisition device that captures an image of a printed surface of a printed product to acquire imaging data of the captured image, the determination device being configured to determine, based on the imaging data acquired by the imaging data acquisition device, a printing method used to produce the printed surface of the printed product for which the image is captured by the imaging data acquisition device,
wherein the determination device selects a plurality of determination areas included in the captured image from the imaging data acquired by the imaging data acquisition device,
acquires determination data based on a line-segment image included in each of the selected plurality of determination areas,
compares the acquired determination data between two determination areas, and acquires, based on a result of the comparison, a determination value for determining a printing method used to produce the printed surface of the printed product, and
determines, based on the acquired determination value, a printing method used to produce the printed surface of the printed product.

26. The determination device according to claim 25, wherein the printed product is a certificate document such as a gift certificate, a bill, a driver's license, a basic resident registration card, a residence card, a special permanent resident certificate, a passport, a voucher, or an identification card.

27. A control method for a determination device to be used in a determination system including an imaging data acquisition device that captures an image of a printed surface of a printed product to acquire imaging data of the captured image, the determination device being configured to determine, based on the imaging data acquired by the imaging data acquisition device, a printing method used to produce the printed surface of the printed product for which the image is captured by the imaging data acquisition device, the control method comprising,
by the determination device:
selecting a plurality of determination areas included in the captured image from the imaging data acquired by the imaging data acquisition device;
acquiring determination data based on a line-segment image included in each of the selected plurality of determination areas;
comparing the acquired determination data between two determination areas, and acquiring, based on a result of the comparison, a determination value for determining a printing method used to produce the printed surface of the printed product; and
determining, based on the acquired determination value, a printing method used to produce the printed surface of the printed product.

28. The control method according to claim 27, wherein the printed product is a certificate document such as a gift certificate, a bill, a driver's license, a basic resident registration card, a residence card, a special permanent resident certificate, a passport, a voucher, or an identification card.

* * * * *